United States Patent
Willis et al.

(10) Patent No.: US 11,176,559 B2
(45) Date of Patent: Nov. 16, 2021

(54) CROSS CHANNEL INTERLINKED RESOURCE DEPLOYMENT SYSTEM

(71) Applicant: BANK OF AMERICA CORPORATION, Charlotte, NC (US)

(72) Inventors: Therese H. Willis, Apopka, FL (US); Srikanth Balagangadhar, Hockessin, DE (US); Himanshu Goyal, Charlotte, NC (US); Martha Sain McClellan, Lancaster, SC (US); James J. Park, Barrington, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 415 days.

(21) Appl. No.: 15/692,905

(22) Filed: Aug. 31, 2017

(65) Prior Publication Data
US 2019/0066106 A1    Feb. 28, 2019

(51) Int. Cl.
*G06Q 20/40* (2012.01)
*H04L 29/08* (2006.01)
*G06Q 20/10* (2012.01)
*G06Q 20/04* (2012.01)
*H04L 12/911* (2013.01)

(52) U.S. Cl.
CPC ......... *G06Q 20/405* (2013.01); *G06Q 20/042* (2013.01); *G06Q 20/1085* (2013.01); *H04L 47/82* (2013.01); *H04L 67/141* (2013.01); *H04L 67/146* (2013.01); *H04L 67/18* (2013.01)

(58) Field of Classification Search
CPC ............... G06Q 20/405; G06Q 20/042; G06Q 20/1085; H04L 47/82; H04L 67/141; H04L 67/146; H04L 67/18
USPC .......................................................... 705/39
See application file for complete search history.

(56) References Cited

U.S. PATENT DOCUMENTS

| | | | |
|---|---|---|---|
| 3,588,449 A | 6/1971 | Paterson et al. | |
| 3,675,816 A | 7/1972 | Bourke et al. | |
| 5,258,855 A * | 11/1993 | Lech .................... | G06K 9/2054 358/448 |
| 5,444,794 A | 8/1995 | Uhland, Sr. | |
| 5,677,955 A | 10/1997 | Doggett et al. | |
| 5,679,938 A | 10/1997 | Templeton et al. | |
| 5,897,625 A | 4/1999 | Gustin et al. | |
| 6,021,202 A | 2/2000 | Anderson et al. | |

(Continued)

*Primary Examiner* — Patrick McAtee
*Assistant Examiner* — Zesheng Xiao
(74) *Attorney, Agent, or Firm* — Michael A. Springs; Moore & Van Allen PLLC; Nicholas C. Russell (57) ABSTRACT

Embodiments of the invention are directed to a system, method, or computer program product for generating a cross channel cross linkage of channel devices associated with an entity for resource distribution. As such, the system allows for resource distribution across entity devices so that distribution may occur at any location. A resource distribution document may be scanned via a remote device associated with the entity. The system may process the resource distribution document via optical character recognition used for data pulling from the resource distribution document. The system may communicate for acquiring, authenticating, routing, switching, and authorizing the resource distribution. Upon approval of the resource distribution the system may provide the user with a unique identifier for input at a cross channel device for distribution of the resources.

17 Claims, 8 Drawing Sheets

(56) References Cited

U.S. PATENT DOCUMENTS

| | | |
|---|---|---|
| 6,196,393 B1 * | 3/2001 | Kruk, Jr. .................. B43M 7/02 |
| | | 209/630 |
| 6,205,437 B1 | 3/2001 | Gifford |
| 6,647,376 B1 | 11/2003 | Farrar et al. |
| 6,705,517 B1 | 3/2004 | Zajkowski et al. |
| 6,786,398 B1 | 9/2004 | Stinson et al. |
| 7,000,828 B2 | 2/2006 | Jones |
| 7,249,069 B2 | 7/2007 | Alie et al. |
| 7,555,462 B2 | 6/2009 | Dutta et al. |
| 7,636,688 B2 | 12/2009 | Kitchen et al. |
| 7,721,969 B2 | 5/2010 | Johnson et al. |
| 8,019,691 B2 | 9/2011 | Dominguez et al. |
| 8,170,954 B2 | 5/2012 | Keresman, III et al. |
| 8,484,128 B2 | 7/2013 | Vihinen |
| 2001/0011230 A1 * | 8/2001 | Morganstein ........ G06Q 20/206 |
| | | 705/18 |
| 2002/0152169 A1 * | 10/2002 | Dutta ..................... G06Q 20/04 |
| | | 705/45 |
| 2003/0023557 A1 * | 1/2003 | Moore ............ G07B 17/00435 |
| | | 705/50 |
| 2009/0171825 A1 * | 7/2009 | Roman .................. G06Q 20/20 |
| | | 705/35 |
| 2011/0016047 A1 * | 1/2011 | Wu .................... G06Q 20/1085 |
| | | 705/43 |
| 2011/0191242 A1 * | 8/2011 | Allen ................... G07F 19/202 |
| | | 705/43 |
| 2012/0024946 A1 * | 2/2012 | Tullis ................... G06Q 20/385 |
| | | 235/379 |
| 2014/0214688 A1 * | 7/2014 | Weiner ............... G06Q 20/3227 |
| | | 705/71 |
| 2016/0019537 A1 * | 1/2016 | Raja .................. G06Q 20/3224 |
| | | 705/43 |
| 2017/0140353 A1 * | 5/2017 | Burdick ............ H04W 12/0608 |

\* cited by examiner

CROSS CHANNEL INTERLINKED RESOURCE DEPLOYMENT SYSTEM

BACKGROUND

With advancements in technology, customers typically have a variety of options for instant access and communication with entities. A customer may have one or more channels and ways within those channels that the customer prefers to communicate. A need exists for cross connectivity of these channels for seamless integration.

BRIEF SUMMARY

Embodiments of the present invention address the above needs and/or achieve other advantages by providing apparatuses (e.g., a system, computer program product and/or other devices) and methods for providing an agent communication aid based on customer context analysis, such that the agent can more effectively assist a customer.

In some embodiments, the system generates a cross channel cross linkage of channel devices associated with an entity for resource distribution. As such, the system allows for resource distribution across entity devices so that distribution may occur at any location. In this way, a user may request resource distribution, such as resource distribution via a check. The user may approach an entity, such as an associate assisted a financial institution location or a self-service channel such as an ATM or the like. An agent associated with financial institution may scan the resource distribution document via a remote device associated with the entity. The system may process the resource distribution document via optical character recognition used for data pulling from the resource distribution document. The system may communicate with a payment orchestration engine for acquiring, authenticating, routing, switching, and authorizing the resource distribution. Upon approval of the resource distribution the system may provide the user with a unique identifier for input at a cross channel device for distribution of the resources. In this way, the system identifies a geographically located cross channel device that has the appropriate denomination for the resource distribution. The user may provide the cross channel device, such as an ATM or the like, with the unique identifier and authorization. The cross channel device may recognize the token and provide the user with the exact denomination associated with the resource distribution document.

Embodiments of the invention relate to systems, methods, and computer program products for cross channel interlinked resource deployment, the invention comprising: interconnecting entity associated silo channels, wherein the interconnection comprises a centralized network connection; scanning, at a remote entity device, a resource distribution document received from a user and store data associated with the resource distribution document; verifying the data associated with the resource distribution document and authorize, in real-time, a resource amount associated with the resource distribution document; identifying an appropriate cross channel device for resource deployment associated with the resource distribution document; generating staging of cross channel deployment of the resources, wherein the staging comprises generation of a token coding for authorization of resource deployment at the appropriate cross channel device; transmitting token to user via the centralized network connection; receiving the token and user authorization at the appropriate cross channel device; and dispensing a resource denomination at the appropriate cross channel device.

In some embodiments, the token for authorization of resource deployment at the appropriate cross channel device comprises coding for a denomination of the resource distribution document and for use only at the appropriate cross channel device.

In some embodiments, the appropriate cross channel device includes a device different from the remote entity device, a device that has a denomination amount exactly matching the resource distribution document, and a device that is geographically located by the user.

In some embodiments, transmitting the token to user via the centralized network connection further comprises providing the token to the user via communication with a user device and the remote entity device.

In some embodiments, the invention further comprises performing optical character recognition on the resource distribution document received from the user via the remote entity device.

In some embodiments, interconnect entity associated silo channels comprises generating a communication linkage to a centralized network connection traditional silo channels including ATM devices. In some embodiments, the resource distribution document is a check.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Although some embodiments of the invention herein are generally described as involving a "financial institution," one of ordinary skill in the art will appreciate that other embodiments of the invention may involve other businesses that take the place of or work in conjunction with the financial institution to perform one or more of the processes or steps described herein as being performed by a financial institution. Still in other embodiments of the invention the financial institution described herein may be replaced with other types of businesses that agent communications aids.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like. In some embodiments, a "marker code" as used herein may refer to one or more marks, signals, data points, or the like that may indicate a misappropriation.

In some embodiments, an "entity" may be a financial institution or third party merchant. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user configuration that includes only personal information associated with the user, or the like. The account is associated with and/or maintained by the entity. In other embodiments, an entity may not be a financial institution. In still other embodiments, the entity may be the merchant itself.

Some portions of this disclosure are written in terms of a financial institution's unique position with respect to customer transactions. As such, a financial institution may be able to utilize its unique position to receive, store, process, retrieve, and present information associated with customer transactions and customer communications.

In some embodiments, a "resource distribution document" as used herein may refer to any paper document or digital signal that may transfer or exchange resources, such as funds, across individuals or entities. Resource distribution documents may include checks, certified checks, automated clearing house, contract, person-to-person payments, credit card payments, debit card payments, transfers of cash, or the like. Furthermore, a cross channel device may include one or more devices associated with an entity that may distribute resources, these devices may include individuals, ATM machines, third party affiliates, financial institutions, computers, tablets, mobile devices, or the like.

The embodiments described herein may refer to the term agent. An agent may include one or more individuals associated with an entity that a customer may communicate with. This agent may be a bank teller, a customer service representative, other employee, partner, or the like associated with the entity. Furthermore, a "channel" as used herein may be one or more ways in which a customer may communicate with an entity, such as a financial institution. These channels may include one or more of online or offline channels. Online channels may include applications, clouds, websites, mobile applications, ATMs, or the like. Offline channels may include store locations, drive through locations, or the like.

In some embodiments, the system generates a cross channel cross linkage of channel devices associated with an entity for resource distribution. As such, the system allows for resource distribution across entity devices so that distribution may occur at any location. In this way, a user may request resource distribution, such as resource distribution via a check. The user may approach an entity, such as a financial institution location or an associated channel such as an ATM or the like. An agent associated with financial institution may scan the resource distribution document via a remote device associated with the entity. The system may process the resource distribution document via optical character recognition used for data pulling from the resource distribution document. The system may communicate with a payment orchestration engine for acquiring, authenticating, routing, switching, and authorizing the resource distribution. Upon approval of the resource distribution the system may provide the user with a unique identifier for input at a cross channel device for distribution of the resources. In this way, the system identifies a geographically located cross channel device that has the appropriate denomination for the resource distribution. The user may provide the cross channel device, such as an ATM or the like, with the unique identifier and authorization. The cross channel device may recognize the token and provide the user with the exact denomination associated with the resource distribution document.

In this way, a user may present a check to an agent at a financial institution. The agent may scan the check using a remote device associated with the financial institution. The system may identify the information on the check and verify the check with the appropriate payment rail. Once verified, the system may identify cross channel devices associated with the financial institution to present the resources to the user. These cross channel devices may include a financial institution teller, ATM, third party entity, person-to-person payments, or the like. These cross channel devices may have the appropriate funds or resources for the distribution. The agent may provide the user with the location of the cross channel device for the resource distribution. These cross channel devices may be at the location of the financial institution or near the location of the user. The agent via the system may provide a unique identifier, such as a token or the like, to the user for the user to present the unique identifier to the cross channel device. The user may present the unique identifier at the cross channel device. The cross channel device will recognize the token based on communication with the system and distribute the resources associated with the original resource distribution document.

Figure 1:
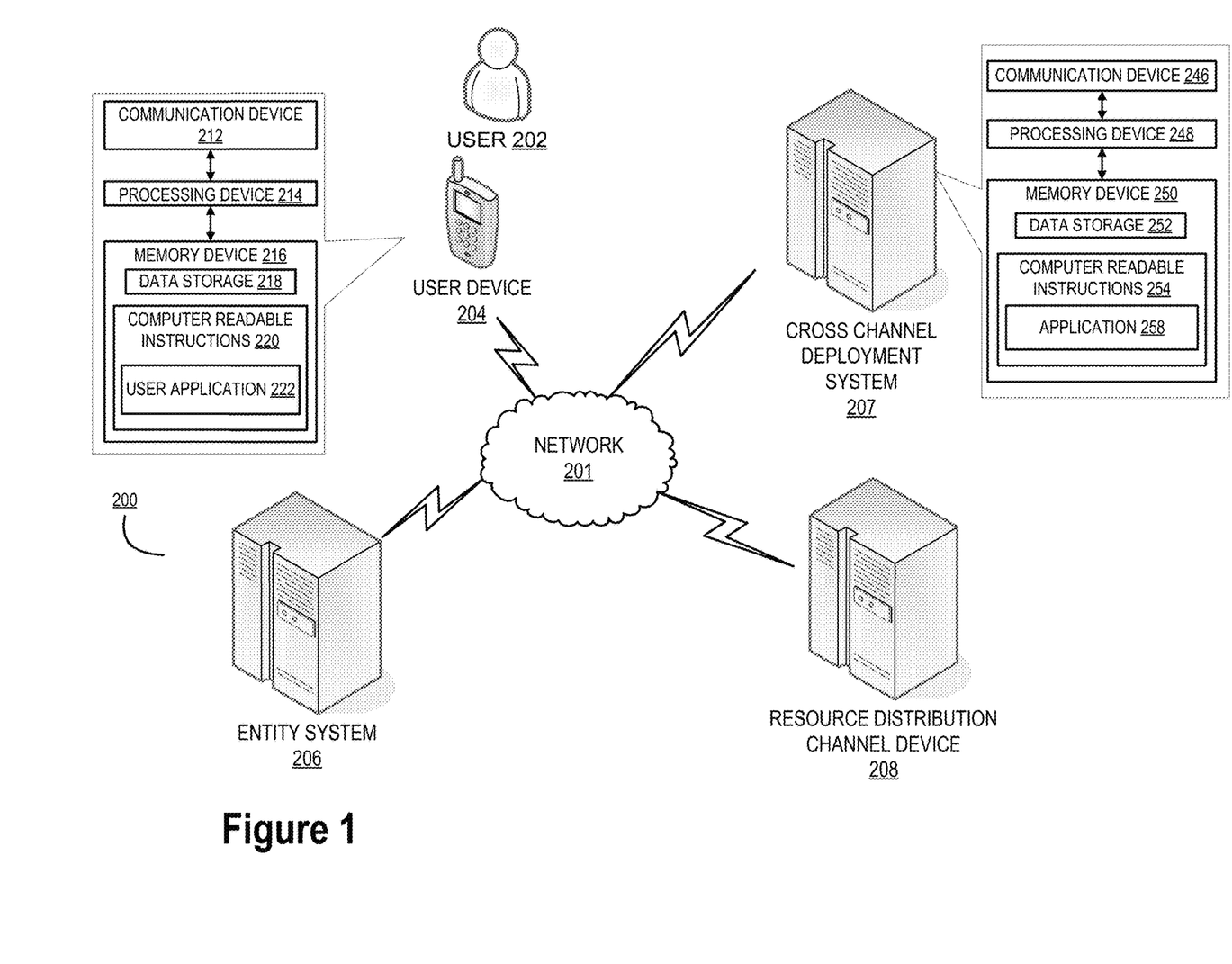
FIG. 1 illustrates a cross channel interlinked resource deployment system environment, in accordance with one embodiment of the present invention.

FIG. 1 illustrates a cross channel interlinked resource deployment system environment 200, in accordance with embodiments of the present invention. FIG. 1 provides the system environment 200 for which the distributive network system with specialized data feeds associated with resource distribution. FIG. 1 provides a unique system that includes specialized servers and system communicably linked across a distributive network of nodes required to perform the functions of real-time validation authorization for resource distribution.

As illustrated in FIG. 1, the resource distribution channel device 208 is operatively coupled, via a network 201 to the user device 204, cross channel deployment system 207, and to the entity system 206. In this way, the resource distribution channel device 208 can send information to and receive information from the user device 204, cross channel deployment system 207, and the entity system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is one or more individuals receiving or distributing resources. The user may have one or more accounts associated with resources for distribution of the resources such as via checks, person-to-person payments, debit cards, credit cards, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the entity system 206, the resource distribution channel device 208, and the cross channel deployment system 207. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to set up marker codes and communicate with the entity system 206.

As further illustrated in FIG. 1, the cross channel deployment system 207 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the resource distribution channel device 208, the entity system 206, and the user device 204. As such, the communication device 246 generally comprises a modem, server, or other device for communicating with other devices on the network 201.

As further illustrated in FIG. 1, the cross channel deployment system 207 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the cross channel deployment system 207 the memory device 250 stores an application 258. Furthermore, the cross channel deployment system 207, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more resource distribution channel device 208, cross channel deployment system 207, and/or user device 204.

As illustrated in FIG. 1, the entity system 206 is connected to the resource distribution channel device 208, user device 204, and cross channel deployment system 207. The entity system 206 has the same or similar components as described above with respect to the user device 204 and the cross channel deployment system 207.

As illustrated in FIG. 1, the resource distribution channel device 208 is connected to the cross channel deployment system 207, user device 204, and entity system 206. In other embodiments, the resource distribution channel device 208 may be a third party system separate from the entity system 206. The resource distribution channel device 208 has the same or similar components as described above with respect to the user device 204 and the entity system 206. While only one resource distribution channel device 208 is illustrated in FIG. 1, it is understood that multiple resource distribution channel device 208 may make up the system environment 200.

It is understood that the servers, systems, and devices described herein illustrate one embodiment of the invention. It is further understood that one or more of the servers, systems, and devices can be combined in other embodiments and still function in the same or similar way as the embodiments described herein. The resource distribution channel device 208 may generally include a processing device communicably coupled to devices as a memory device, output devices, input devices, a network interface, a power source, one or more chips, and the like. The resource distribution channel device 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like. The memory device may store any of a number of applications or programs which comprise computer-executable instructions/code executed by the processing device to implement the functions of the resource distribution channel device 208 described herein.

Figure 2A:
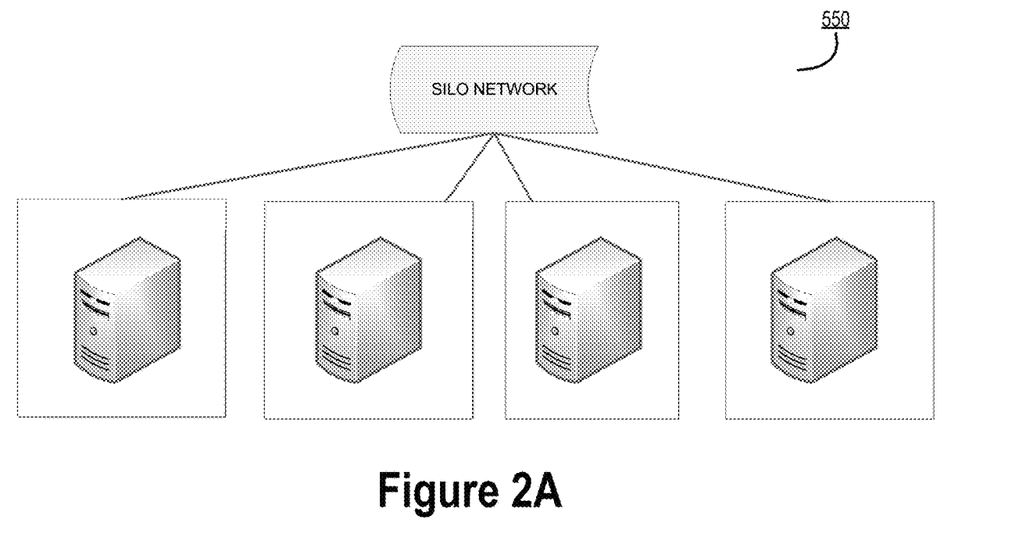
FIG. 2A illustrates a silo network environment, in accordance with one embodiment of the present invention.

FIG. 2A illustrates a silo network environment 550, in accordance with one embodiment of the present invention. In a traditional resource distribution network, each node or channel of resource distribution, such as a financial institution branch, ATM, or the like act independently of each other and are not able to communicate with each other. As such, they are currently structured in a silo system where each is individualized without an ability to communicate with each other for resource distribution.

Figure 2B:
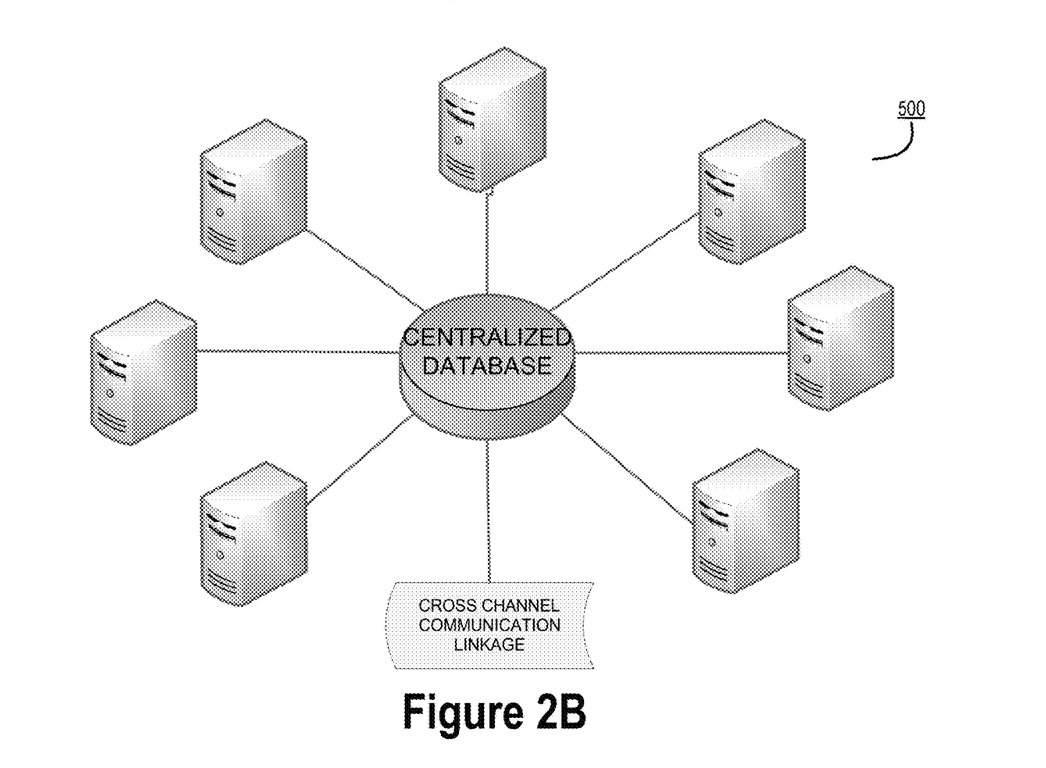
FIG. 2B illustrates a cross linked network environment, in accordance with one embodiment of the present invention.

FIG. 2B illustrates a cross linked network environment 500, in accordance with one embodiment of the present invention. As illustrated in FIG. 2B a centralized database architecture comprises multiple nodes or channels from one or more sources and converge into a centralized database via a cross channel communication linkage generated via the system. As such, the channels for resource distribution may communicate information across various channels for resource distribution and deployment. The system, in this embodiment, may generate a single centralized data repository and communication linkage between the various nodes.

Figure 3:
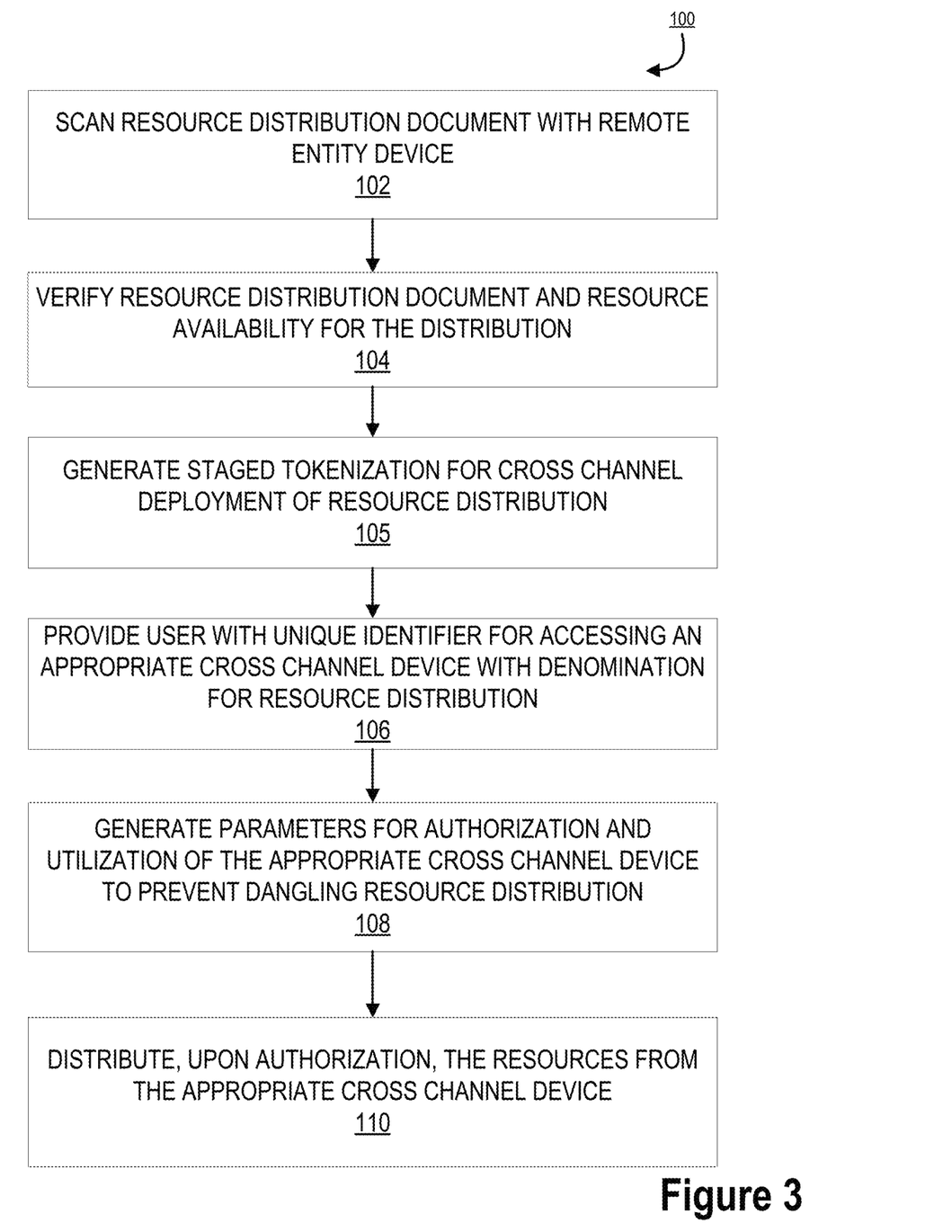
FIG. 3 illustrates a high level process map for cross channel interlinked resource deployment, in accordance with one embodiment of the present invention.

FIG. 3 illustrates a high level process map for cross channel interlinked resource deployment 100, in accordance with one embodiment of the present invention. Utilizing the centralized database architecture comprises multiple nodes or channels from one or more sources and converge into a centralized database via a cross channel communication linkage generated via the system for deployment of the process 100. As such, the channels for resource distribution may communicate information across various channels for resource distribution and deployment. The system, in this embodiment, may generate a single centralized data repository and communication linkage between the various nodes.

As illustrated in block 102, the process 100 is initiated by scanning the resource distribution document with a remote entity device. In this way, a user may provide an agent with a resource distribution document, such as a check for distribution. The agent may have a remote device associated with the entity, such as a mobile device, tablet, or the like. The agent may be able to scan the resource distribution document and extract the data on the document via optical character recognition. The data may then be communicated within the entity for verification of the resource distribution document and resource availability for the distribution, as illustrated in block 104.

Next, as illustrated in block 105, the process 100 continues by generating a staged tokenization for cross channel deployment of resource distribution. In this way, the system may stage the resource distribution at a cross channel device, such as an ATM or the like. The staging may identify the appropriate cross channel device for the resource distribution and reserving the resources at that device for distribution. The appropriate cross channel device may be identified based on the geographic location of the device and the device that has the appropriate resources for distribution.

As illustrated in block 106, the process 100 continues by providing the user with a unique identifier for accessing the appropriate cross channel device with appropriate resource denominations for resource deployment. In this way, the user may present the unique identifier and an authorization, such as a credit card, debit card, PIN number, or the like at the appropriate cross channel device to receive the resource distribution. In some embodiments, the identifier may be provided to the user via the user's mobile device. In other embodiments, the agent may provide the user with the identifier.

As illustrated in block 108, the process 100 continues by generating parameters for authorization and utilization of the appropriate cross channel device to prevent dangling resource distribution. In this way, there may be a selected duration of time for the user to access the appropriate cross channel device. After that time, the resource distribution transaction may be timed out and the unique identifier no longer authorized for the resource distribution.

As illustrated in block 110, the process 100 ends by distributing the resources at the appropriate cross channel device upon user input of the unique identifier and appropriate authorization.

Figure 4:
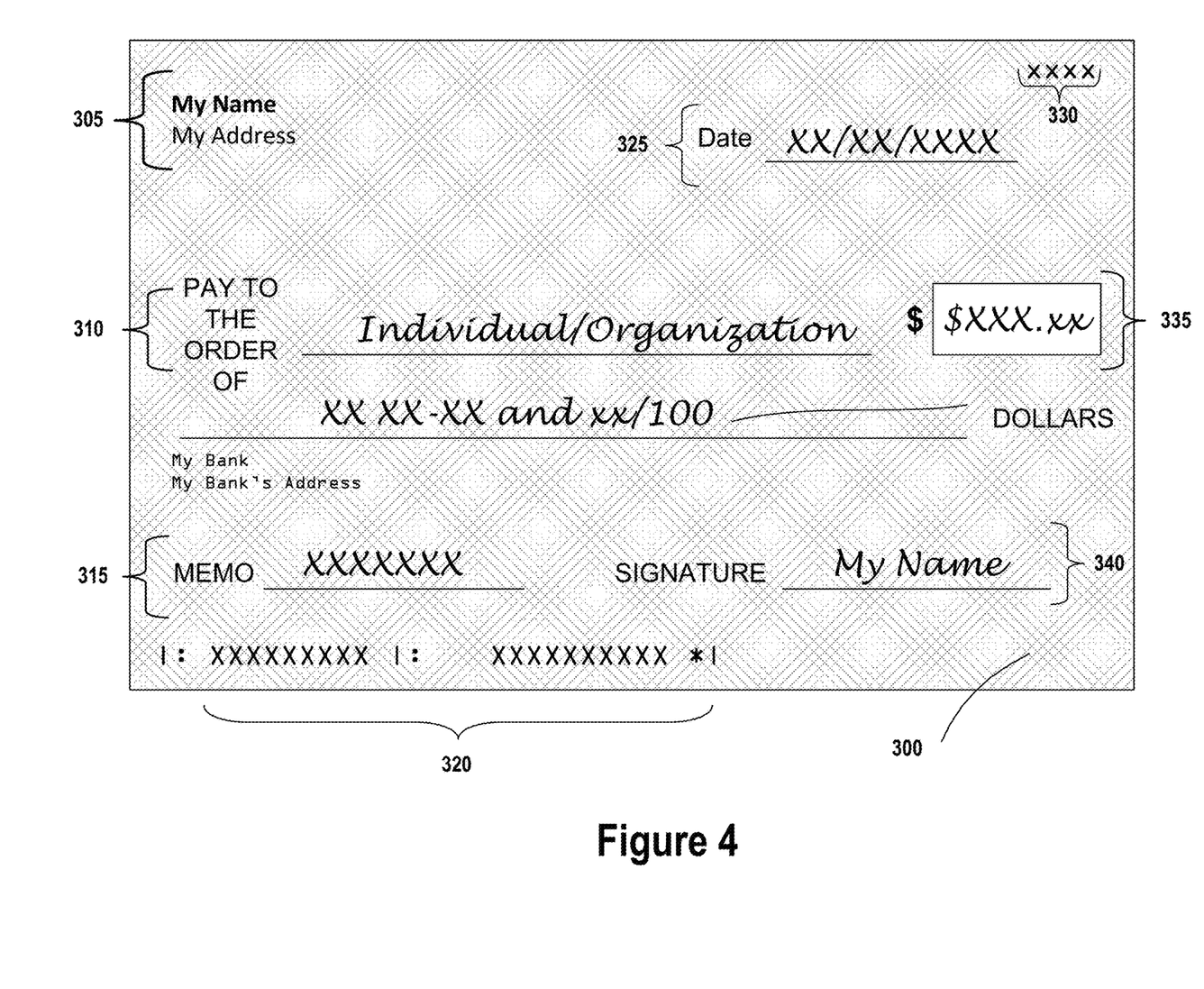
FIG. 4 provides an illustration of a resource distribution document, in accordance with one embodiment of the present invention.
Figure 5:
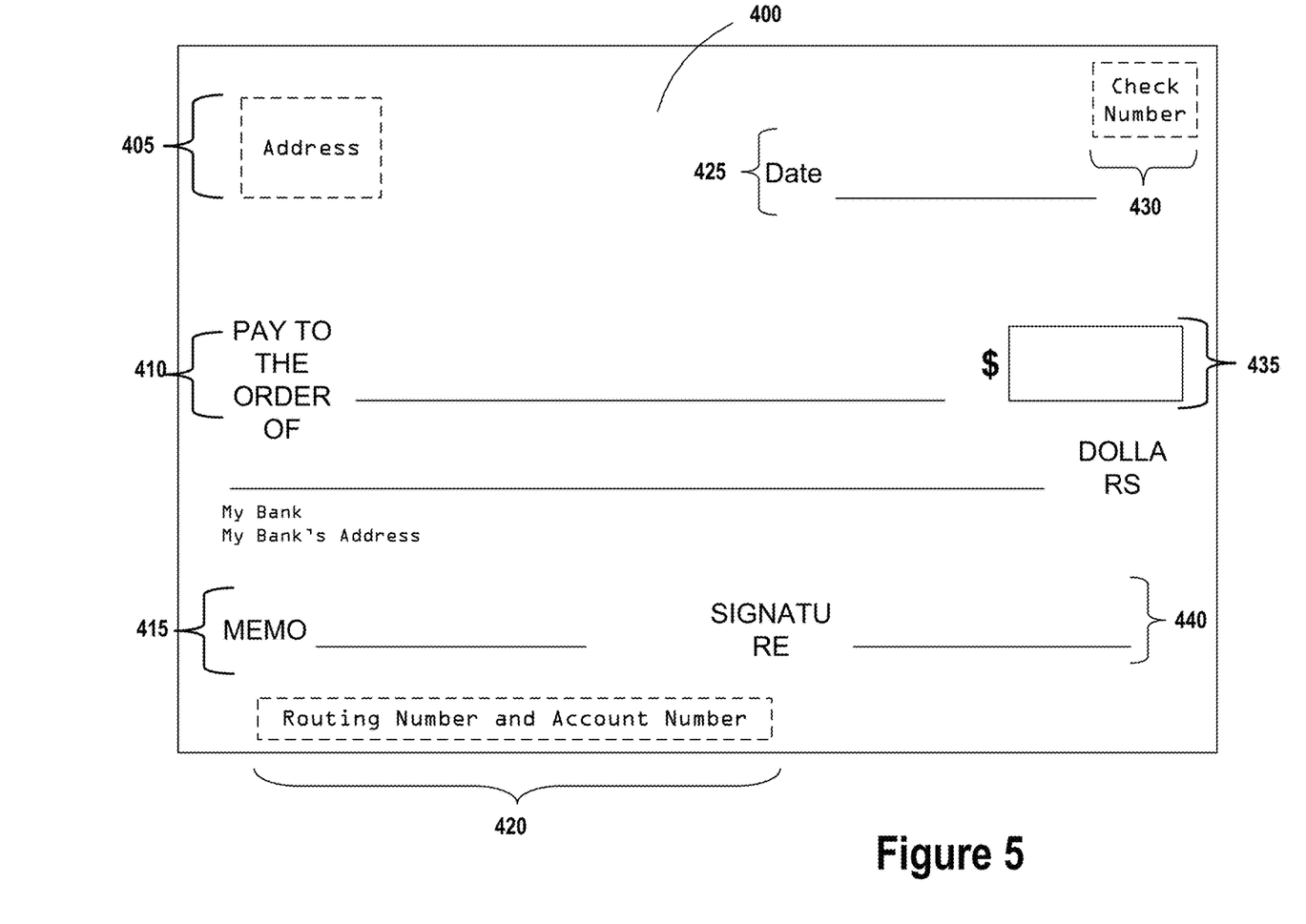
FIG. 5 provides an illustration of a resource distribution document, in accordance with one embodiment of the present invention.

FIG. 4 illustrates a representation of one embodiment of a resource distribution document 500, in accordance with embodiments of the present invention. The resource distribution document illustrated in FIG. 5 is a check. However, one will appreciate that any financial record, financial document, or the like may be provided as a resource distribution document.

The check 300 may comprise an image of the entire check, a thumbnail version of the image of the check, individual pieces of check information, all or some portion of the front of the check, all or some portion of the back of the check, or the like. Check 300 comprises check information, wherein the check information comprises contact information 305, the payee 310, the memo description 315, the account number and routing number 320 associated with the appropriate customer account, the date 325, the check number 330, the amount of the check 335, the signature 340, or the like. In some embodiments, the check information may comprise text. In other embodiments, the check information may comprise an image.

FIG. 5 illustrates a representation of one embodiment of a resource distribution document 400, in accordance with embodiments of the present invention. Again, the resource distribution document illustrated in FIG. 5 is a check. However, one will appreciate that any financial record, financial document, or the like may be provided.

In the illustrated embodiment, the check corresponds to the entire front portion of a check, but it will be understood that the check may also correspond to individual pieces of check information, portions of a check, or the like. The check, in some embodiments, includes the format of certain types of checks associated with a bank, a merchant, an account holder, types of checks, style of checks, check manufacturer, and so forth. The check comprises check information, wherein the check information includes, for example, a contact information field 405, a payee line field 410, a memo description field 415, an account number and routing number field 420 associated with the appropriate user or customer account, a date line field 425, a check number field 430, an amount box field 435, a signature line field 440, or the like.

Figure 6:
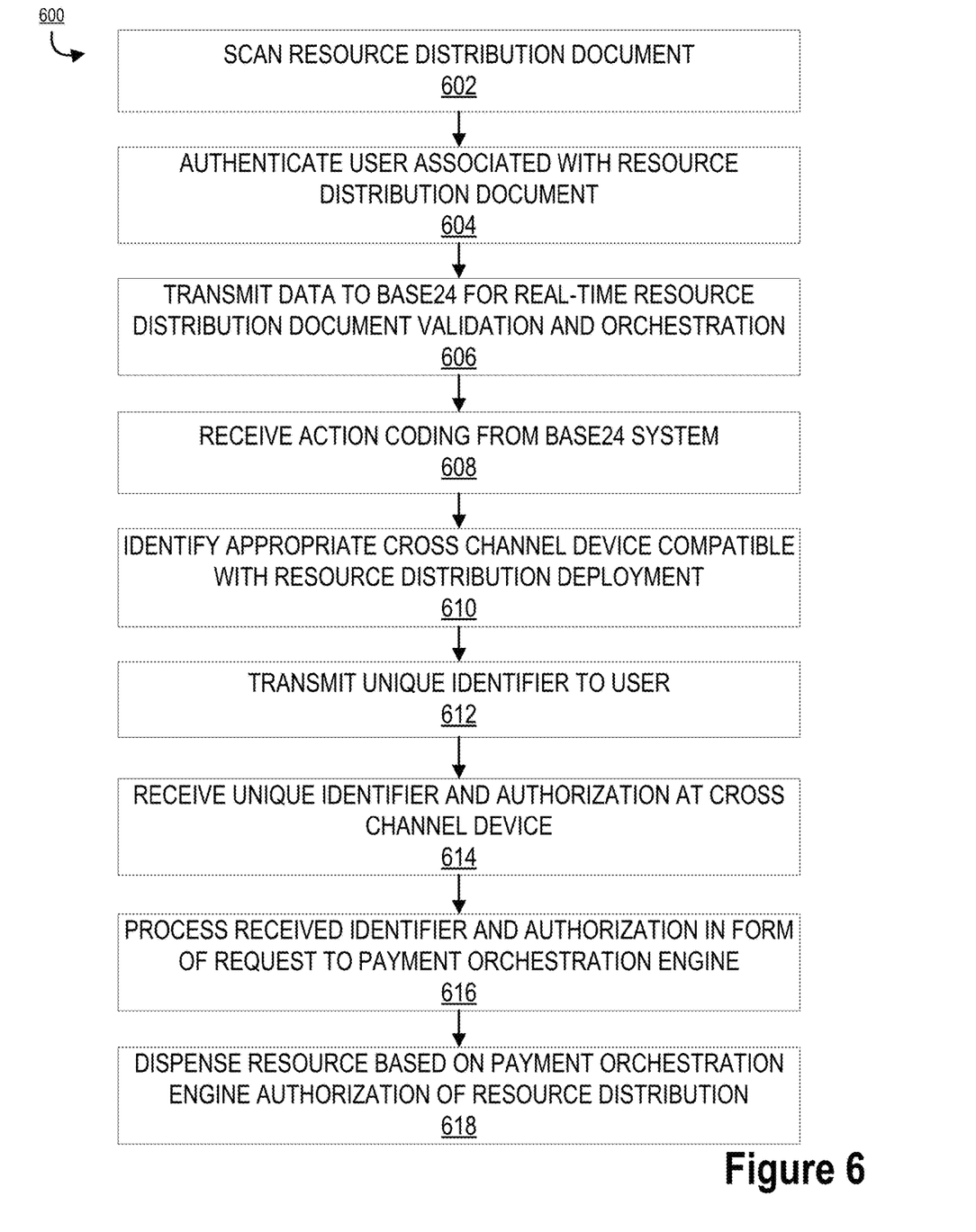
FIG. 6 illustrates a process map for initiation of cross channel resource authorization and deployment, in accordance with one embodiment of the present invention.

FIG. 6 illustrates a process map for initiation of cross channel resource authorization and deployment 600, in accordance with one embodiment of the present invention. As illustrated in block 602, the process is initiated by scanning the resource distribution document. In this way, a user may provide an agent with a resource distribution document, such as a check for distribution. The agent may have a remote device associated with the entity, such as a mobile device, tablet, or the like. The agent may be able to scan the resource distribution document and extract the data on the document via optical character recognition.

Next, as illustrated in block 604, the process 600 may authenticate the user associated with the resource distribution document. In this way, the user may authenticate with the entity. In this way, the user may present the agent or the remote device associated with the entity a credit card, debit card, or the like and associated PIN or password. In other embodiments, the user may provide a username and password to the agent. In this way, the user may authorize into an account the user has with the entity, such as a checking, savings, or other type of account the user may have with the entity financial institution.

Upon authentication of the user, meta-data from the optical character recognition may be transmitted to a payment orchestration processor for real-time resource distribution document validation and orchestration, as illustrated in block 606. The payment orchestration engine is utilized for acquiring, authenticating, routing, switching, and authorizing the resource distribution. The payment orchestration system may process the resource distribution document in real-time for distribution of the resources and the denomination associated with the resource distribution document. As such, the system may receive the action coding from the payment orchestration system for approval and authorization of the resource distribution, as illustrated in block 608. The centralized system may also allow the transmission of the approval to the remote device associated with the agent.

Next, as illustrated in block 610, the process 600 continues by identifying an appropriate cross channel device compatible with the resource distribution deployment. In some embodiments, the appropriate cross channel device may have the appropriate denominations for the resource distribution. In some embodiments, the appropriate cross channel device may be at a geographic area near the user and/or near the agent. In some embodiments, the appropriate cross channel device is both in close geographic location to the user and with the appropriate denominations for the resource distribution from the resource distribution document.

Upon authorization of the resource distribution document and appropriate cross channel device, the system may transmit a unique identifier to the user, as illustrated in block 612. In some embodiments, the identifier may be provided to the user via the user's mobile device. In other embodiments, the agent may provide the user with the identifier. In some embodiments, the unique identifier is a token As illustrated in block 614, the process 600 continues by receiving the unique identifier and authorization at the appropriate cross channel device. In this way, the user may present the unique identifier and an authorization, such as a credit card, debit card, PIN number, or the like at the appropriate cross channel device to receive the resource distribution.

Next, as illustrated in block 616, the process 600 continues by processing the received identifier and authorization in form of the request to the payment orchestration system. The unique identifier includes a token that includes an indication of the approval of the resource distribution document and a hold on the funds associated with the resource distribution for distribution at the appropriate cross channel device. Finally, as illustrated in block 618, the process 600 is completed by dispensing the resources from the appropriate cross channel device based on payment orchestration system authorization of the resource distribution.

Figure 7:
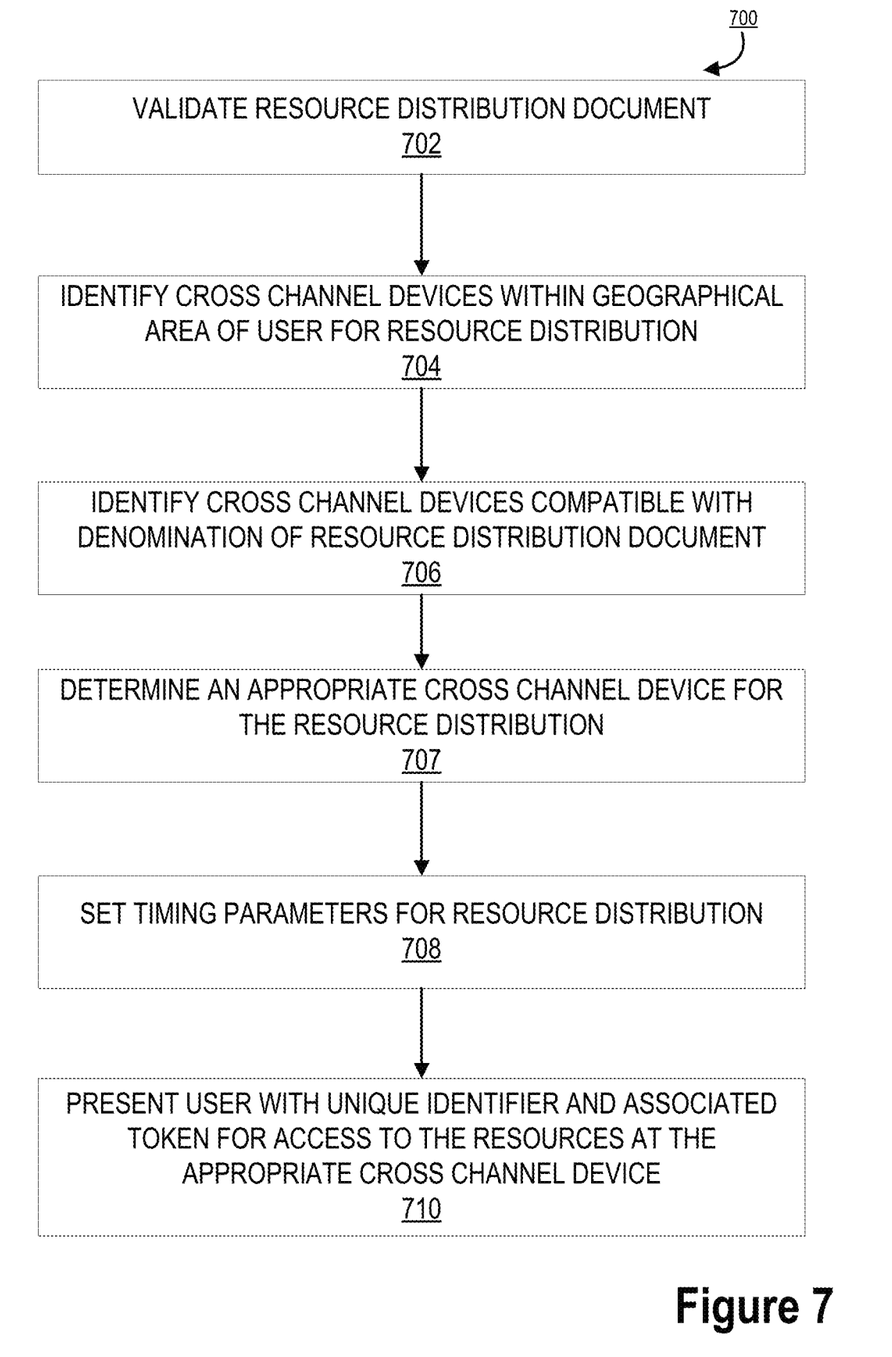
FIG. 7 illustrates a process map for resource distribution requirements and authorization via cross channels, in accordance with one embodiment of the present invention.

FIG. 7 illustrates a process map for resource distribution requirements and authorization via cross channels 700, in accordance with one embodiment of the present invention. As illustrated in block 702, the process 700 is initiated by validating the resource distribution document for resource distribution based on scanning from the agent. Validation confirms the authenticity of the document and extracts funds from an account associated with the document for distribution.

As illustrated in block 704, the process 700 continues by identifying cross channel devices within a geographical area associated with the user or the entity for resource distribution. In some embodiments, the cross channel device may be within the financial institution that the user presented the resource distribution document to the agent. In this way, the cross channel device may be a teller, ATM, or the like associated with the financial institution the user is currently visiting. In other embodiments the cross channel device may be at a geographical area requested by the user.

Next, as illustrated in block 706, the process 700 continues by identifying cross channel devices compatible with denomination of the resource distribution document. In this way, the system may identify the cross channel devices that have the amount of funds equivalent to the resource distribution document. This way, the cross channel device selected has the resources necessary for distribution to the user.

As illustrated in block 707, the process 700 continues by determining the appropriate cross channel device for the resource distribution. The appropriate cross channel device is a device that has the requested denomination and within a geographic area either at the financial institution or at a user selected geographic location. Furthermore, the system may set timing parameters for the resource distribution, as illustrated in block 708. In this way, the system may generate one or more time ranges or time durations that the user can extract the resources from the appropriate cross channel device.

Finally, as illustrated in block 710, the process 700 is finalize by presenting the user with a unique identifier and associates a token for access to the resources at the appropriate cross channel device. In some embodiments, the unique identifier may be a token transmitted to the user device for presentation at the appropriate cross channel device. The token may encode the validation of the resource distribution document and code specifically for the appropriate cross channel device. In this way, the user may present the unique identifier and an authorization, such as a credit card, debit card, PIN number, or the like at the appropriate cross channel device to receive the resource distribution. In some embodiments, the identifier may be provided to the user via the user's mobile device. In other embodiments, the agent may provide the user with the identifier.

In some embodiments, the user may not present the unique identifier to the cross channel device within the parameters allocated for the transaction. Upon identification of the parameters not being met, the system may automatically deposit the resources from the resource distribution document into an account associated with the user. In this way, the resources may still be available to the user, but instead of being distributed directly to the user via the cross channel device, the resources are deposited in a user account for user access.

Figure 8:
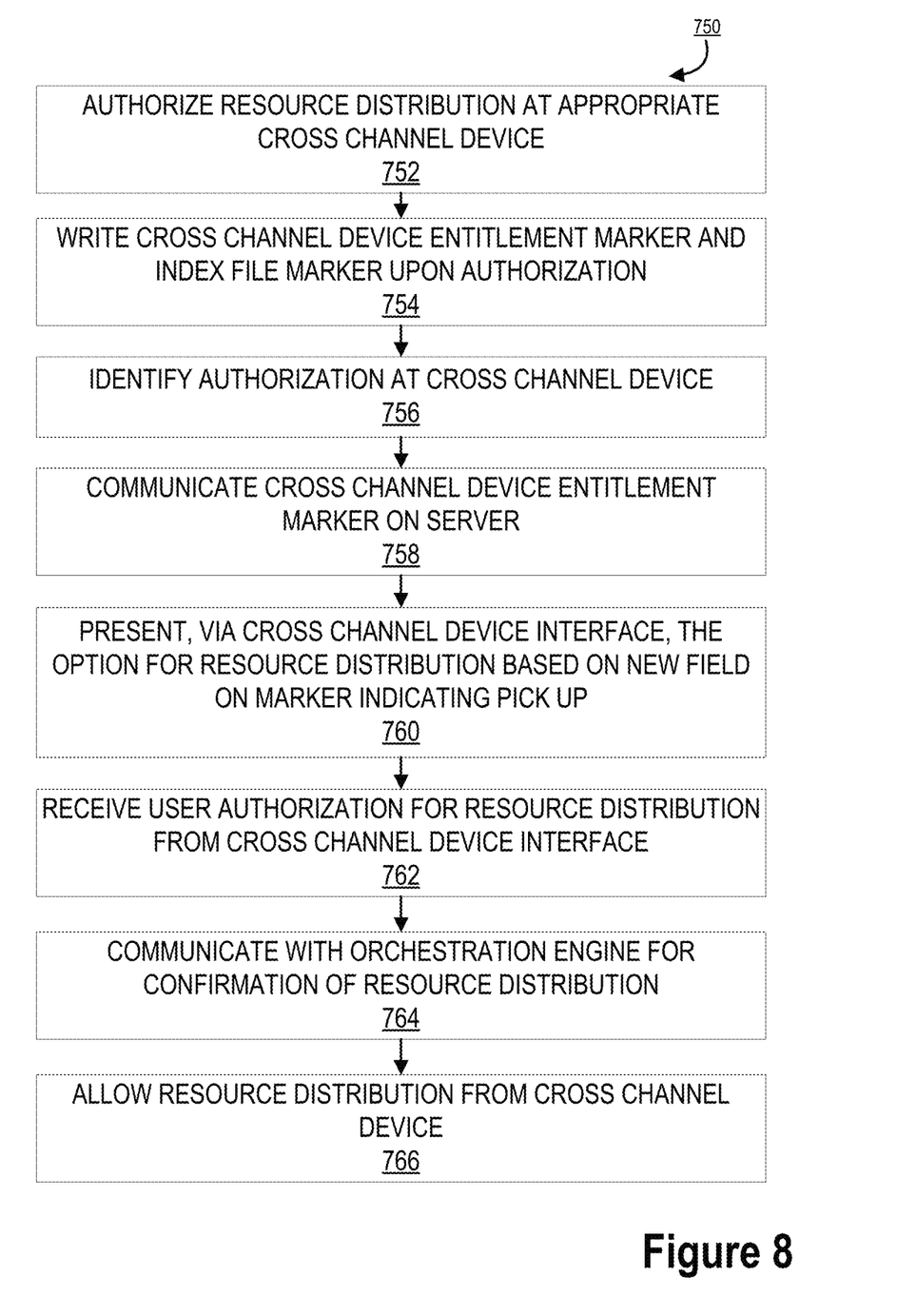
FIG. 8 illustrates a process map for internal resource distribution processing requirements and authorization via cross channels, in accordance with one embodiment of the present invention.

FIG. 8 illustrates a process map for internal resource distribution processing requirements and authorization via cross channels 750, in accordance with one embodiment of the present invention. As illustrated in block 752, the process 750 is initiated by authorizing a resource distribution at an appropriate cross channel device. Upon scanning of the resource distribution document and authorization of distribution of the resources associated with the document to the appropriate cross channel device, the system may continue by writing two markers, including a cross channel device entitlement marker and an index file marker, as illustrated in block 754.

In some embodiments, the cross channel device entitlement marker that is associated with an ATM and defines the language of transaction, preferences, fast cash amounts, receipt preferences and/or the like. This marker identifies that the user is at that particular cross channel device for receiving the resource distribution associated with the resource distribution document. The index file marker is written to define the amount, the recourse account for depositing the funds if the transaction is suspended.

As illustrated in block 756, the process 750 continues by identifying authorization of the user at the appropriate cross channel device. Upon authorization of the user at the cross channel device, the system may communicate to the cross channel device the cross channel device entitlement marker on the system server, as illustrated in block 758.

Next, as illustrated in block 760, the process 750 continues by presenting, via the cross channel device interface, the user with the option for resource distribution based on a new filed identified on the cross channel device entitlement marker that indicates the user is at that cross channel device for resource pick up from the resource distribution document. In some embodiments, the system may integrate into the cross channel device and manipulation for display of the resource distribution on a display associated with the cross channel device.

As illustrated in block 762, the process continues by receiving user authorization for the resource distribution from the cross channel device. In this way, the user may input the unique identifier at the appropriate cross channel device. As illustrated in block 764, the process 750 may continue by communicating with the orchestration engine for confirmation of resource distribution. In this way, the system may communicate the unique identifier and token associated therewith to the payment orchestration engine. In this way, the system may look up the transaction within the marked index file to match the token and to identify that the resource distribution is authorized for pick up at that cross channel device. As such, confirming that the transaction has not already occurred and/or to identify any potential misappropriation of the resource distribution.

Finally, if a match has been identified, the process 750 may continue by allowing for resource distribution from the appropriate cross channel device, as illustrated in block 766.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for cross channel interlinked resource deployment, the system comprising:
   a memory device with computer-readable program code stored thereon;
   a communication device;
   a processing device operatively coupled to the memory device and the communication device, wherein the processing device is configured to execute the computer-readable program code to:
      interconnect entity associated silo channels, wherein the interconnection comprises a centralized network connection;
      scan, at a remote entity device, a resource distribution document received from a user and store data associated with the resource distribution document;
      verify the data associated with the resource distribution document and authorize, in real-time, a resource amount associated with the resource distribution document;
      identify an appropriate cross channel device for resource deployment associated with the resource distribution document, wherein identifying the appropriate cross channel device further comprises:
         identifying one or more cross channel devices in close geographic proximity to the user; and
         identifying a specific cross channel device of the one or more cross channel devices as the appropriate cross channel device for resource deployment by confirming that the specific cross channel device contains an exact denominations of resources matching the resource distribution document;
      generate staging of cross channel deployment of the resources, wherein the staging comprises transmission of instructions to the appropriate cross channel device requesting reservation of the exact denomination of resources matching the resource distribution document, generation of a token coding for authorization of resource deployment at the appropriate cross channel device, wherein the token is for deployment of a denomination of resources of the resource distribution document and is only useable at the appropriate cross channel device, and generation of parameters limiting a duration for which the token can be utilized before expiring;
      transmit the token to the user via the centralized network connection;
      present the user an option for resource distribution via an interface with the appropriate cross channel device;
      acknowledge a failure of the user to provide the token;
      based on the failure of the user to provide the token, determine that parameters for resource deployment are not met; and
      automatically deposit the resources from the resource distribution document into an account of the user.

2. The system of claim 1, wherein the appropriate cross channel device includes a device that is different from the remote entity device, has a denomination amount exactly matching the resource distribution document, and is geographically located by the user.

3. The system of claim 1, wherein transmitting the token to user via the centralized network connection further comprises providing the token to the user via communication with a user device and the remote entity device.

4. The system of claim 1, further comprising performing optical character recognition on the resource distribution document received from the user via the remote entity device.

5. The system of claim 1, wherein interconnect entity associated silo channels comprises generating a communication linkage to a centralized network connection traditional silo channels including ATM devices.

6. The system of claim 1, wherein the resource distribution document is a check.

7. A computer program product for cross channel interlinked resource deployment, the computer program product comprising at least one non-transitory computer-readable medium having computer-readable program code portions embodied therein, the computer-readable program code portions comprising:

an executable portion configured for interconnecting entity associated silo channels, wherein the interconnection comprises a centralized network connection;

an executable portion configured for scanning, at a remote entity device, a resource distribution document received from a user and store data associated with the resource distribution document;

an executable portion configured for verifying the data associated with the resource distribution document and authorize, in real-time, a resource amount associated with the resource distribution document;

an executable portion configured for identifying an appropriate cross channel device for resource deployment associated with the resource distribution document, wherein identifying the appropriate cross channel device further comprises:

an executable portion configured for identifying one or more cross channel devices in close geographic proximity to the user; and an executable portion configured for identifying a specific cross channel device of the one or more cross channel devices as the appropriate cross channel device for resource deployment by confirming that the specific cross channel device contains an exact denominations of resources matching the resource distribution document;

an executable portion configured for generating staging of cross channel deployment of the resources, wherein the staging comprises transmission of instructions to the appropriate cross channel device requesting reservation of the exact denomination of resources matching the resource distribution document, generation of a token coding for authorization of resource deployment at the appropriate cross channel device, wherein the token is for deployment of a denomination of resources of the resource distribution document and is only useable at the appropriate cross channel device, and generation of parameters limiting a duration for which the token can be utilized before expiring;

an executable portion configured for transmitting the token to the user via the centralized network connection;

an executable portion configured for presenting the user an option for resource distribution via an interface with the appropriate cross channel device;

an executable portion configured for acknowledging a failure of the user to provide the token;

based on the failure of the user to provide the token, determining that parameters for resource deployment are not met; and an executable portion configured for automatically depositing the resources from the resource distribution document into an account of the user.

8. The computer program product of claim 7, wherein the appropriate cross channel device includes a device that is different from the remote entity device, has a denomination amount exactly matching the resource distribution document, and is geographically located by the user.

9. The computer program product of claim 7, wherein transmitting the token to user via the centralized network connection further comprises providing the token to the user via communication with a user device and the remote entity device.

10. The computer program product of claim 7, an executable portion configured for performing optical character recognition on the resource distribution document received from the user via the remote entity device.

11. The computer program product of claim 7, wherein interconnect entity associated silo channels comprises generating a communication linkage to a centralized network connection traditional silo channels including ATM devices.

12. The computer program product of claim 7, wherein the resource distribution document is a check.

13. A computer-implemented method for cross channel interlinked resource deployment, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

interconnecting entity associated silo channels, wherein the interconnection comprises a centralized network connection;

scanning, at a remote entity device, a resource distribution document received from a user and store data associated with the resource distribution document;

verifying the data associated with the resource distribution document and authorize, in real-time, a resource amount associated with the resource distribution document;

identifying an appropriate cross channel device for resource deployment associated with the resource distribution document, wherein identifying the appropriate cross channel device further comprises:

identifying one or more cross channel devices in close geographic proximity to the user; and identifying a specific cross channel device of the one or more cross channel devices as the appropriate cross channel device for resource deployment by confirming that the specific cross channel device contains an exact denominations of resources matching the resource distribution document;

generating staging of cross channel deployment of the resources, wherein the staging comprises transmission of instructions to the appropriate cross channel device requesting reservation of the exact denomination of resources matching the resource distribution document, generation of a token coding for authorization of resource deployment at the appropriate cross channel device, wherein the token is for deployment of a denomination of resources of the resource distribution document and is only useable at the appropriate cross channel device, and generation of parameters limiting a duration for which the token can be utilized before expiring;

transmitting the token to the user via the centralized network connection;

presenting the user an option for resource distribution via an interface with the appropriate cross channel device;

acknowledging a failure of the user to provide the token;

based on the failure of the user to provide the token, determining that parameters for resource deployment are not met; and automatically depositing the resources from the resource distribution document into an account of the user.

14. The computer-implemented method of claim 13, wherein the appropriate cross channel device includes a device that is different from the remote entity device, has a denomination amount exactly matching the resource distribution document, and is geographically located by the user.

15. The computer-implemented method of claim 13, wherein transmitting the token to user via the centralized network connection further comprises providing the token to the user via communication with a user device and the remote entity device.

16. The computer-implemented method of claim 13, further comprising performing optical character recognition on the resource distribution document received from the user via the remote entity device.

17. The computer-implemented method of claim 13, wherein interconnect entity associated silo channels comprises generating a communication linkage to a centralized network connection traditional silo channels including ATM devices.

* * * * *